United States Patent Office 3,555,080
Patented Jan. 12, 1971

3,555,080
SULFONIC ACIDS AND THEIR DERIVATIVES AND METHODS OF PREPARING SAME
Paul Raphael Resnick, Wilmington, Del., assignor to E. I. du Pont de Nemours and Company, Wilmington, Del., a corporation of Delaware
No Drawing. Filed Aug. 25, 1969, Ser. No. 852,943
Int. Cl. C07c *143/08*
U.S. Cl. 260—513           3 Claims

ABSTRACT OF THE DISCLOSURE

Compounds of the formula $$CF_3CFHOCF_2CFXSO_2M$$

wherein X is F or $CF_3$, and M is a monovalent group, for example hydroxyl, are disclosed. These compounds are useful in such applications as dielectric fluids or dispersing agents.

---

This invention relates to new hydrogen-containing fluorocarbon compounds and to processes for obtaining these compounds.

Sulfonyl-containing fluorocarbon ethers are disclosed in U.S. Pat. No. 3,301,893 to Putnam et al. Ethylenically unsaturated derivatives of these ethers are disclosed in U.S. Pat. No. 3,282,875 to Connolly et al.

The present invention provides new sulfonyl-containing fluorocarbon ethers which are free of ethylenic unsaturation. These new ether compounds can be represented by the formula $$CF_3CFHOCF_2CFXSO_2M$$

wherein X is F or $CF_3$, and M is a monovalent group such as F, Cl, OH or —OMe, wherein Me is $NH_4$, quaternary ammonium or alkali metal. Any alkali metal can be present. Examples of quaternary ammonium compounds include the tetraalkyl and tetraalkyl-aryl substituted groups, such as tetraethyl ammonium, tetramethyl ammonium, and phenyltrimethyl ammonium.

One general method for preparing the compounds of this invention having the above-described formula, except that the $-SO_2M$ group is $-SO_2OMe$, is to contact and react an aqueous solution of basic compound with a cyclic sulfone of the formula

wherein X is the same as hereinbefore defined. Me in the reaction product is the cation of the basic compound and corresponds to Me of the group —OMe. For convenience, the reaction can be conducted at atmospheric pressure and ambient temperature (20–25° C.) However, higher and lower temperatures and pressures can be used. For example, temperatures from 10 to 105° C. can be used. The group —OMe is converted to hydroxyl, F or Cl by known procedures. For example, the hydroxyl group can be obtained by reaction of the reaction product with a strong inorganic acid such as $H_2SO_4$. The Cl group can be obtained by reacting the reaction product with a chlorinating agent such as $PCl_5$. This chlorine-terminated reaction product can then be reacted with a fluorinating agent such as NaF to obtain the compound of the present invention wherein —OMe is F.

The cyclic sulfone starting material can be prepared by pyrolyzing at a temperature of from 200 to 600° C. and in contact with a dry alkali metal salt such as $Na_2CO_3$, a compound of the formula $$FSO_2CFXCF_2OCFCF_3COF$$

wherein X has the same meaning hereinbefore described, which is disclosed in U.S. Pat. No. 3,301,893 to Putnam et al., and separating the resultant cyclic sulfone from the reaction products. Alternatively, the —COF compound of Putman et al. can be reacted with an aqueous solution of alkali metal base to form the corresponding salt, followed by drying and pyrolysis.

The halide form of these compounds of this invention are relatively inert high boiling liquids and therefore can be used as dielectric fluids. The ammonium and alkali metal forms of the compounds are solids. The compounds of this invention wherein M is hydroxyl or —OMe can be used as dispersing agents, being especially useful in systems for polymerizing fluorocarbons. The sulfonic acid form of the compounds are also useful as an acid catalyst in acid-catalyzed reactions, especially when an organic liquid media is present since the sulfonic acids are generally soluble in organic solvents.

The following examples are intended to be illustrative of the present invention and not a limitation of the scope thereof. Parts and percents are by weight unless otherwise indicated.

EXAMPLE 1

A dried 500 ml. three necked flask was fitted with a magnetic stirrer, thermometer, pressure equalizing dropping funnel and small distilling head topped by a Dry Ice cooled trap. To the flask was added 20 parts of anhydrous sodium carbonate and 100 parts of diethylene glycol dimethyl ether. The mixture was stirred and 27.5 parts of crude

(70 percent purity) was added. The mixture was heated and 17.6 parts of a colorless distillate obtained which contained 70 percent of one component. The distillate was washed with water, dried with anhydrous sodium sulfate and redistilled to give a liquid, boiling point 85° C., of greater than 97 percent purity whose NMR and IR spectra were in agreement with the

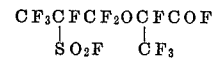

structure.

To a 250 ml. flask fitted with a magnetic stirrer was added 100 parts of 0.10 molar sodium hydroxide solution and 3.5 parts of

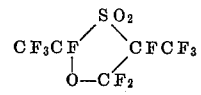

The reaction mixture was stirred at ambient temperature for 17 hours. The trace of lower layer was separated and the aqueous layer evaporated to give 2.3 parts of a white solid whose infrared and NMR spectra was in agreement with the

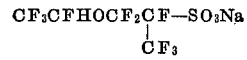

structure.

EXAMPLE 2

To a 200 ml. round bottom flask fitted with a magnetic stirrer and a water cooled condenser were added 3.2 parts sodium hydroxide and 75 parts of water. After the sodium hydroxide was dissolved, 27.7 parts of

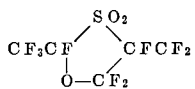

were added and an exothermic reaction took place. The reaction mixture was stirred at 60–80° C. for 2.5 hours, the very small lower layer was separated and the upper aqueous layer extracted twice with methylene chloride. The aqueous layer was evaporated to dryness to give 26 parts (100 percent) of a white solid whose IR and NMR spectra were in agreement with a

structure.

EXAMPLE 3

To a 100 ml. round bottom flask fitted with a thermometer, magnetic stirrer and water cooled condenser were added 50 parts of water, 5 parts of 13.84 M ammonium hydroxide solution and 20 parts of

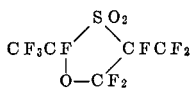

While the reaction mixture was stirred an exothermic reaction took place and the temperature rose from 29 to 57° C. and the organic layer almost disappeared. Stirring was continued at ambient temperature overnight and the reaction mixture evaporated to give 20.6 parts of a white solid (94.5 percent) whose IR and NMR spectra were in agreement with a $CF_3CFHOCF_2CF_2SO_3NH_4$ structure.

Calculated for $C_4F_8H_5NO_4S$ (percent): C, 15.2; F, 48.2. Found C, 15.5; F, 47.8.

As many apparently widely different embodiments of this invention may be made without departing from the spirit and scope thereof, it is to be understood that this invention is not limited to the specific embodiments thereof except as defined in the appended claims.

What is claimed is:

1. Compounds of the formula

wherein X is F or $CF_3$, and M is F, Cl, hydroxyl, or —OMe wherein Me is alkali metal, $NH_4$ or quaternary ammonium.

2. The compound of claim 1 wherein Me is sodium.

3. A process comprising contacting and reacting an aqueous solution of a basic compound with a cyclic sulfone of the formula

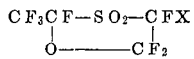

wherein X is F or $CF_3$ and obtaining as a result thereof the corresponding compound of the formula

wherein X has the same meaning as above and wherein Me is alkali metal, $NH_4$ or quaternary ammonium.

References Cited

Temple, J. Org. Chem. 33, 344–346 (1968).

DANIEL D. HORWITZ, Primary Examiner

U.S. Cl. X.R.

260—327, 501.15, 543; 252—65, 426